Tillson & Whinfield.
Bleaching App's.
No. 2,320. Reissued Jul. 24, 1866.
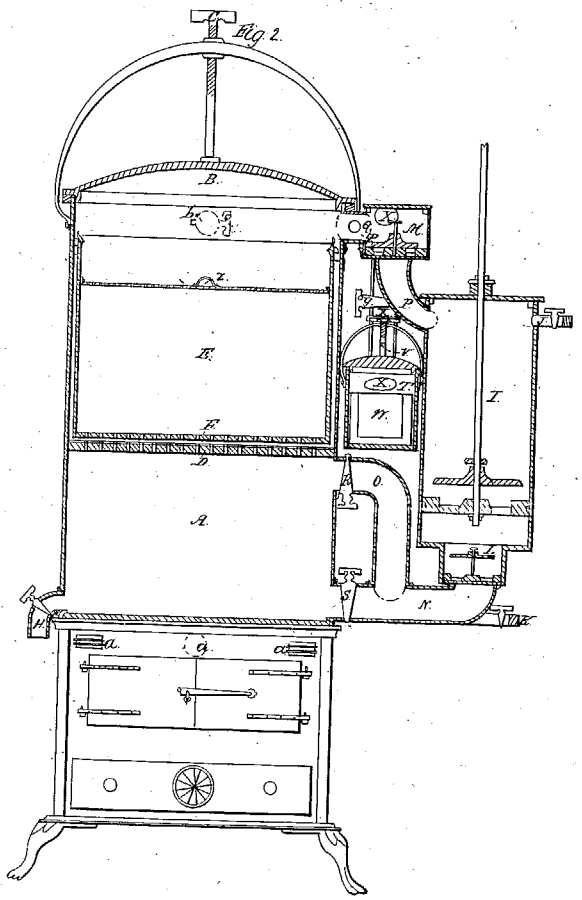
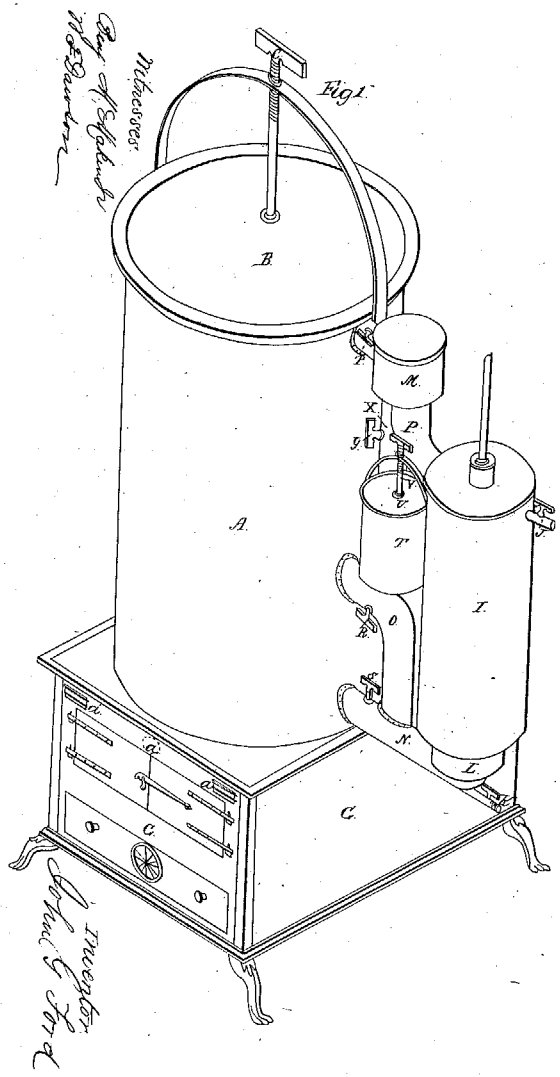
Witnesses.
Benj. H. Blakeslee
W. E. Dawson
Inventor.
John G. Ford

UNITED STATES PATENT OFFICE.

JOHN G. FORD, OF PHILADELPHIA, PENNSYLVANIA, ASSIGNEE, BY MESNE ASSIGNMENTS, OF J. A. JILLSON AND H. WHINFIELD.

IMPROVED APPARATUS FOR WASHING AND BLEACHING FIBROUS AND TEXTILE SUBSTANCES.

Specification forming part of Letters Patent No. 13,650, dated October 9, 1855; Reissue No. 2,320, dated July 24, 1866.

*To all whom it may concern:*

Be it known that JULIUS A. JILLSON, of the city of Poughkeepsie, county of Dutchess and State of New York, and HENRY WHINFIELD, of the said city, county, and State, did invent new and useful Improvements for Treating Textile and Fibrous Substances and Materials; and I do hereby declare that the following is a full, clear, and exact description of the same, reference being had to the annexed drawings, which form a part of this specification, representing the machine, in which—

Figure 1 is an elevated perspective view, and Fig. 2 is a vertical sectional view.

The same letters have reference to the same parts in each view.

A is the cylinder. B is the air-tight cover. C is a set-screw in a movable arch confining the cover B. D is a strainer, fixed or movable, made of metal or its equivalent material, resting on a rib or bracket in the cylinder A. E is a movable inside cylinder with strainer F made similar to strainer D. G is a furnace under cylinder, either for heating air or liquids. H is a cock to run off the liquids or refuse. I is a double or single acting force-pump, with valves, piston, and piston-rod, to be driven by hand or power. J and K are cocks on said pump for air or liquid. L is a valve and chamber at bottom of pump. M is a valve and chamber at top of pump. N is a pipe connecting bottom of cylinder A with the lower valve, L, of pump. O is pipe connecting with cylinder A and valve L. P is pipe connecting top of pump with top of cylinder A and passing through valve M. Q R S are three stop-cocks for changing the working of the machine herein described. T is a small chamber connected with pump I and cylinder A by pipe X. U is a cover to T. V is a set-screw confining the cover U air-tight. W is a glass cup or dish in said small chamber T. Y is a stop-cock in pipe X. Z is a movable cover used in the inner cylinder E, or in the cylinder A, perforated similar to the strainers D or F, for the purpose of keeping the textile or fibrous substances and materials in said cylinders E and A level and of a uniform height, and also making a uniform distribution on the surface of the contents of said cylinders A and E. *a a* is a pipe passing through and around furnace G, connected with the top of cylinder A at *b b* with a shut cock, *c c*, when not used.

To enable others skilled in the art to make and use the said invention, I will proceed to describe its construction and mode of operation.

The said machine is constructed of any suitable materials, such as iron, brass, copper, zinc, tin, or wood, or their equivalents, of any given size or shape suitable or equivalent to perform and operate on the various textile and fibrous fabrics or substances. The method of washing or cleansing the said various textile and fibrous fabrics or substances of dirt and gum from animal or vegetable wools, silks, rags, and all other materials or substances of a similar nature is by placing any of the last-named articles, materials, or fabrics in the cylinder A or E, and having also placed a sufficient or desired quantity of cleansing-liquid in the cylinder A, made of soap or any other composition or equivalent, either hot or cold, as the case may require, and the pump being set in motion, our said method commences either in the ordinary way or by force or in a vacuum or partial vacuum, either by heat or otherwise, made in said machine or similar or equivalent. By opening the stop-cocks R and J and closing the stop-cocks K, P, Y, and S a vacuum or partial vacuum will be obtained, and having all the stop-cocks closed except S and Q, which are open, and a sufficient or desired quantity of cleansing-fluid having been placed in the said cylinder A with the said textile and fibrous fabrics or substances before named, and working the pump as before described, the cleansing-liquid is forced and rotated through and through the various textile and fibrous fabrics or substances or animal or vegetable wools, silks, rags, wearing-apparel, and all other materials of a similar nature, without rubbing or injuring the same, until in a short time every particle of dirt or gum, &c., is removed and taken out and refuse or dirty liquid discharged by the cock K, which is or can be connected with either hot or cold water. A stream of clean water can be introduced for rinsing purposes, and rotated through and through and continued and changed until in a few minutes the contents of the said cylinders will be entirely cleansed and rinsed without removing, twisting, or injuring the said contents of said cylinders.

There is attached to this machine, as shown by letter T, a small chamber or vessel with pipes connecting to said machine, for the purpose of generating and passing into the washing chamber or cylinder A and E bleaching or disinfecting gases, or liquids are forced through and through, over and over in a vacuum or partial vacuum, or in the ordinary way, until in a very short time the contents of said cylinders A and E will be perfectly bleached or disinfected, and then by closing the stop-cocks J, K, P, and S the said bleaching or disinfecting gases or liquids can be nearly all forced back into the small chamber T and retained in the same by closing the stop-cock Y until wanted again. The cylinder A can then be opened and contents removed. In fact the washing or cleansing, rinsing, bleaching, and dyeing can be completed without taking any of the aforesaid materials, articles, or substances out of a machine constructed according to this description substantially.

Having thus described the said improvement of said JILLSON and WHINFIELD, what is claimed as new, and desired to secure by Letters Patent, is—

1. The process of washing, cleansing, or extracting gum, dirt, or other similar matter from fibrous and textile substances or materials by inserting them in a closed vessel or receiver and forcing the cleansing or extracting fluids to circulate through the material by the action of a pump.

2. The rinsing of the materials by forcing fresh cleansing-liquid into and through the fibrous and textile substances and materials and out of the closed washing or extracting chamber by means of a pump.

3. The forcing of a bleaching solution to circulate through the mass of fibrous and textile substance and materials contained within a closed receiver or extracting chamber by means of a pump.

4. The combination of a closed receiver or extracting chamber or vessel with a pump, for causing a direct circulation through it, as described.

5. The employment, in a closed vessel or receiver, of an upper strainer or perforated diaphragm for causing a uniform distribution of the liquid upon the matter treated, in combination with a lower perforated diaphragm or strainer for permitting the circulation of the extracting, cleansing, or bleaching liquid.

6. The employment of a closed vessel for cleansing or extracting, with a fire below, and having a lower perforated diaphragm, whereby the material is above the bottom of the boiler and prevented from being acted upon by the fire.

7. Forming within a closed receiver or extractor a chamber below the lower perforated diaphragm for the cleansing or extracting liquid.

8. The combination of the closed cleansing or extracting vessel, the heater, and the pump for forcing the heated liquor to circulate through the mass.

9. The combination of the closed receiver or extracting-vessel, the lower perforated diaphragm or strainer, the heater, and the pump.

10. The combination of the closed receiver or extracting-vessel, the upper and lower perforated diaphragm or strainer, and the pump *f*.

JOHN G. FORD.

Witnesses:
W. W. DOUGHERTY,
FRANCIS M. DOUGHERTY.